(12) United States Patent
Hayashi et al.

(10) Patent No.: US 11,603,063 B2
(45) Date of Patent: Mar. 14, 2023

(54) OCCUPANT PROTECTION DEVICE

(71) Applicant: TOYODA GOSEI CO., LTD., Kiyosu (JP)

(72) Inventors: Takeki Hayashi, Kiyosu (JP); Kazumi Fukaura, Kiyosu (JP); Shinji Yamada, Ichinomiya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/215,025

(22) Filed: Mar. 29, 2021

(65) Prior Publication Data
US 2021/0300278 A1    Sep. 30, 2021

(30) Foreign Application Priority Data

Mar. 31, 2020    (JP) .............................. JP2020-061818

(51) Int. Cl.
*B60R 21/18*    (2006.01)
(52) U.S. Cl.
CPC .................................. *B60R 21/18* (2013.01)
(58) Field of Classification Search
CPC ...................................................... B60R 21/18
See application file for complete search history.

(56) References Cited

U.S. PATENT DOCUMENTS

| | | | | |
|---|---|---|---|---|
| 5,062,662 A | * | 11/1991 | Cameron | B60R 21/268 280/801.1 |
| 5,794,971 A | * | 8/1998 | Boydston | B60R 21/18 280/743.1 |
| 5,863,065 A | * | 1/1999 | Boydston | B60R 21/01 280/735 |
| 5,871,230 A | * | 2/1999 | Lewis | B60R 22/14 280/743.1 |

(Continued)

FOREIGN PATENT DOCUMENTS

| | | | | |
|---|---|---|---|---|
| CN | 112776748 A | * | 5/2021 | ............. B60R 21/18 |
| CN | 113830019 A | * | 12/2021 | ......... B60R 21/2338 |

(Continued)

OTHER PUBLICATIONS

Office Action dated Jan. 6, 2023 issued in corresponding Japanese Patent Application No. 2020-061818 (and English machine translation).

*Primary Examiner* — Nicole T Verley
(74) *Attorney, Agent, or Firm* — Posz Law Group, PLC

(57) ABSTRACT

An occupant protection device, which protects an occupant seated in a seat, includes: an airbag; and a holder configured to accommodate and hold the folded airbag. The holder is arranged in front of a waist of the occupant seated on the seat. The airbag inflows inflation gas into the inside and inflates so as to protrude from the holder and toward the occupant side, the airbag including: a lower inflation portion configured to cover an upper surface of the thigh; an upper inflation portion which configured to cover a front surface of (Continued)

an upper body; and a cross-inflation portion arranged between the lower inflation portion and the upper inflation portion. A length dimension of the holder is set to a dimension which secures a space for arranging the inflated cross-inflation portion between the waist and the holder when the inflation of the airbag is completed.

3 Claims, 14 Drawing Sheets

(56) References Cited

U.S. PATENT DOCUMENTS

| | | | | |
|---|---|---|---|---|
| 6,062,596 | A * | 5/2000 | Boydston | B60R 21/2072 280/733 |
| 6,378,898 | B1 | 4/2002 | Lewis et al. | |
| 7,677,598 | B1 * | 3/2010 | Ryan | B60R 21/18 280/730.2 |
| 10,518,739 | B2 * | 12/2019 | Jaradi | B60R 22/03 |
| 11,292,425 | B2 * | 4/2022 | Akoma | B60R 22/14 |
| 11,390,232 | B2 * | 7/2022 | Fischer | B60N 2/002 |
| 2013/0009391 | A1 * | 1/2013 | Miller | B60R 21/18 280/806 |
| 2013/0127140 | A1 * | 5/2013 | Obadia | B60R 21/207 280/733 |
| 2015/0054263 | A1 * | 2/2015 | Renaudin | B60N 2/2812 280/728.2 |
| 2016/0059818 | A1 * | 3/2016 | Witt | B60R 21/237 280/743.1 |
| 2016/0075299 | A1 * | 3/2016 | Wang | B60R 22/34 280/733 |
| 2019/0299899 | A1 | 10/2019 | Einarsson et al. | |
| 2019/0315470 | A1 * | 10/2019 | Humbert | B64D 11/0621 |
| 2019/0344743 | A1 * | 11/2019 | Jaradi | B60R 21/231 |
| 2020/0122667 | A1 * | 4/2020 | Young | A44B 11/2569 |
| 2020/0122668 | A1 * | 4/2020 | Ozaki | B60R 21/231 |
| 2020/0290545 | A1 * | 9/2020 | Walker | B60R 21/18 |
| 2021/0094496 | A1 * | 4/2021 | Tanaka | B60R 21/20 |
| 2021/0300277 | A1 * | 9/2021 | Fukaura | B60R 21/2338 |
| 2021/0300278 | A1 * | 9/2021 | Hayashi | B60R 21/18 |
| 2021/0300292 | A1 * | 9/2021 | Yamada | B60N 2/688 |
| 2022/0048460 | A1 * | 2/2022 | Yamada | B60R 21/233 |

FOREIGN PATENT DOCUMENTS

| | | | | |
|---|---|---|---|---|
| DE | 19724191 | A1 * | 12/1998 | B60R 21/18 |
| DE | 102018202227 | A1 * | 8/2019 | B60R 21/18 |
| GB | 2368050 | A * | 4/2002 | B60R 21/18 |
| JP | 2003-519040 | A | 6/2003 | |
| JP | 2008-247087 | A | 10/2008 | |
| JP | 2008290697 | A * | 12/2008 | B60R 21/18 |
| JP | 2009-166774 | A | 7/2009 | |
| JP | 5191208 | B2 * | 5/2013 | B60R 21/18 |
| JP | 5799841 | B2 * | 10/2015 | |
| JP | 2021054250 | A * | 4/2021 | B60R 21/18 |
| JP | 2021160710 | A * | 10/2021 | B60R 21/18 |
| JP | 2022032920 | A * | 2/2022 | B60R 21/207 |
| KR | 2019108688 | A * | 9/2019 | B60R 21/18 |
| WO | WO-9747498 | A1 * | 12/1997 | B60R 21/18 |
| WO | WO-9856619 | A1 * | 12/1998 | B60R 21/18 |
| WO | WO-9942334 | A1 * | 8/1999 | B60R 21/213 |
| WO | WO-9944865 | A1 * | 9/1999 | B60R 21/017 |
| WO | WO-0100456 | A1 * | 1/2001 | B60R 21/18 |
| WO | WO-0232726 | A1 * | 4/2002 | B60R 21/18 |
| WO | WO-2007069398 | A1 * | 6/2007 | B60R 21/18 |
| WO | WO-2021030033 | A1 * | 2/2021 | B60R 19/18 |

* cited by examiner

FIG.3
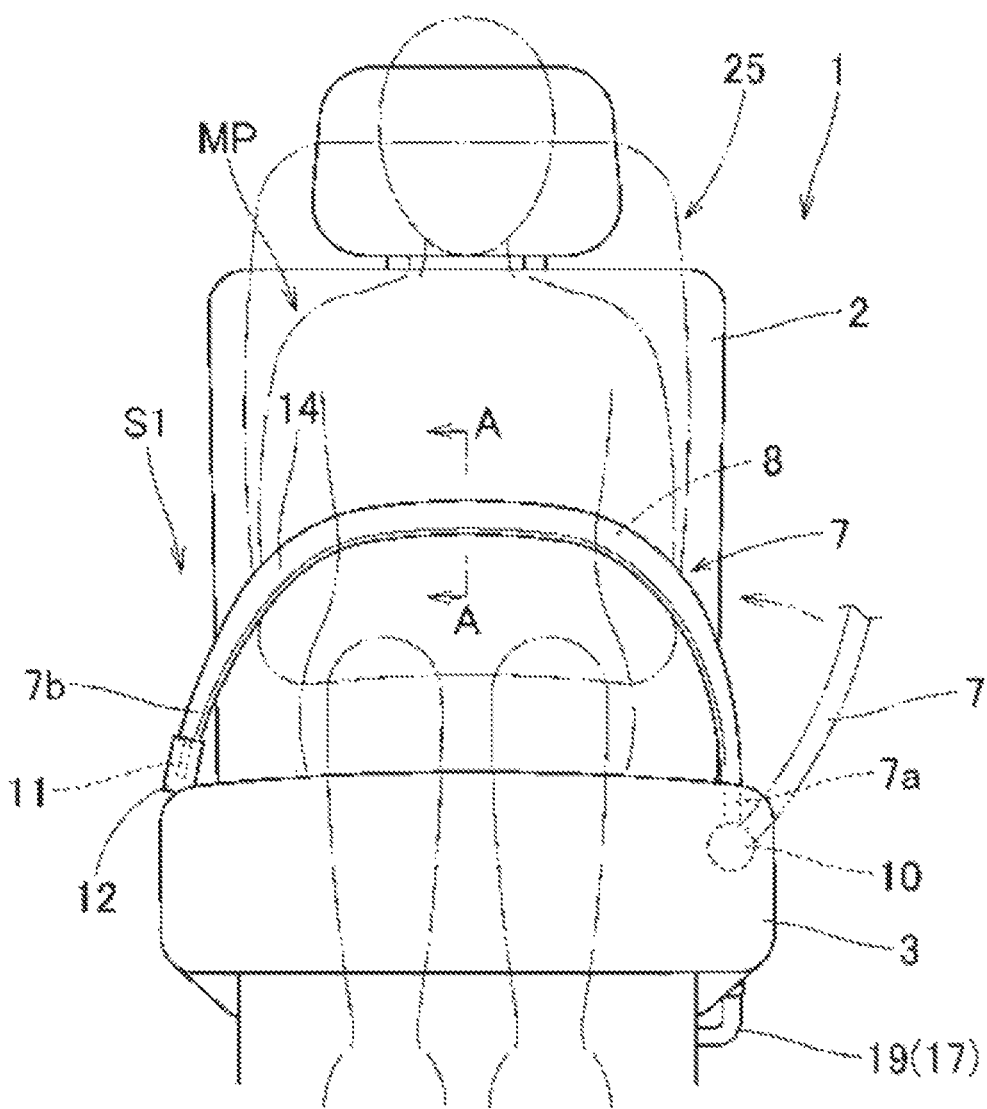
A-A PART SCHEMATIC CROSS SECTION
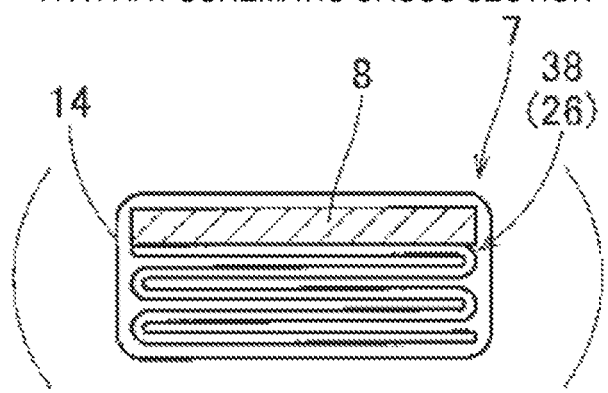

OCCUPANT PROTECTION DEVICE

CROSS-REFERENCE TO RELATED APPLICATION(S)

This application is based upon and claims the benefit of priority from prior Japanese patent application No. 2020-061818 filed on Mar. 31, 2020, the entire contents of which are incorporated herein by reference.

BACKGROUND

1. Field of the Invention

The present invention relates to an occupant protection device for protecting an occupant seated on a seat.

2. Description of the Related Art

In a recent year, as an occupant protection device, there is provided a device having a configuration in which a holder for accommodating and holding a folded airbag is set in front of a waist of an occupant seated on a seat (see, for example, U.S. Patent Application Publication No. 2019/299899). In this occupant protection device of the related art, the airbag inflates so as to protrude forward and upward from the holder when operated, and when the inflation is completed, the airbag is configured to cover from an upper surface of a thigh of the occupant to a front surface of an upper body.

However, in the occupant protection device of the related art, the holder is composed of a rod-shaped body which is set substantially in a left-right direction in front of the waist when the occupant is seated and the airbag is configured to inflate so as to protrude forward and upward from such a holder. Therefore, the holder is interposed between the airbag when the inflation is completed and the occupant, and thus the front side of the waist cannot be covered by the airbag without a gap. As a result, there is room for improvement in restraining the waist of the occupant with the airbag which has completed inflation.

SUMMARY

The invention solves the problems described above and an object thereof is to provide an occupant protection device capable of accurately restraining a waist of an occupant by an airbag which completes inflation.

According to an aspect of the invention, there is provided an occupant protection device, which protects an occupant seated in a seat, including: an airbag which is folded and accommodated as a bag shape made of a flexible sheet body; and a holder configured to accommodate and hold the folded airbag, where: the holder is a long body where one end side is set as a fixed side end and is connected to one side surface side of the seat and the other end side is set as a movable side end and is configured to be connected to the other side surface side of the seat and is arranged in front of a waist of the occupant seated on the seat when the movable side end is connected to the side surface side of the seat: the airbag is connected to an inflator arranged on the seat side via a gas supply path portion arranged on the fixed end side, inflows inflation gas into the inside and inflates so as to protrude from the holder and toward the occupant side, and is configured to cover from an upper surface of a thigh of the occupant to a front surface of an upper body of the occupant when inflation is completed, the airbag including: a lower inflation portion configured to cover the upper surface of the thigh when inflation is complete; an upper inflation portion configured to cover the front surface of the upper; and a cross-inflation portion arranged between the lower inflation portion and the upper inflation portion; and a length dimension of the holder is set to a dimension which secures a space for arranging the inflated cross-inflation portion between the waist and the holder when the inflation of the airbag is completed.

The occupant protection device of the invention has a configuration in which the holder which accommodates and holds the folded airbag is arranged in front of the waist of the occupant seated on the seat at the time of wearing and the airbag has a configuration in which the inflation gas flows into the inside when the inflator is operated and the airbag inflates while protruding from the holder toward the occupant side. Then, when the inflation of the airbag is completed, the cross-inflation portion arranged between the upper inflation portion and the lower inflation portion is arranged between the holder and the waist. That is, in the occupant protection device of the invention, when the inflation of the airbag is completed, the lower inflation portion covering the upper surface of the thigh, the upper inflation portion covering the front surface of the upper body, and the cross-inflation portion placed between the lower inflation portion and the upper inflation portion are configured to be arranged so as to cover a wide area from the upper surface of the thigh to the front surface of the upper body, including the front surface of the waist. As a result, in the occupant protection device of the invention, when the inflation is completed, the airbag is configured to be arranged so as to cover from the upper surface of the thigh of the occupant, through the waist, to the front surface of the upper body directly by the inflation portion itself having cushioning properties, with almost no gap. As a result, the waist can be accurately restrained.

Therefore, in the occupant protection device of the invention, the waist of the occupant can be accurately restrained by the airbag which completes the inflation.

In the occupant protection device according to the above, the holder may be formed of a material having shape-retaining property and may be curved in a substantially U-shape. According to the above, a separation distance between the holder and the occupant when the movable side end is connected (attached) to the side surface side of the seat can be kept substantially constant.

In the occupant protection device according to the above, the holder may include a holder body, formed from a flexible strip-shaped body, whose length dimension can be adjusted, the folded body in which the airbag is folded and the gas supply path portion extending from the folded body may be arranged so as to be deviation-movable with respect to the holder body, the holder may be arranged so as to cover an outer peripheral surface side of the holder body at positions between the folded body and the fixed side end and the movable side end, and the holder may be configured to have a position adjusting unit configured to adjust a position of the folded body with respect to the occupant in a direction along the holder body when worn.

When the occupant protection device has such a configuration, in the holder, the holder body formed from the flexible strip-shaped body can be attached by adjusting the length so as not to be slackened significantly with respect to the waist of the occupant having a different physique. In addition, the position adjusting unit arranged on both sides of the folded body allows the position of the folded body to be adjusted with respect to the occupant when worn. Therefore, even when the holder body is attached by adjusting the length, the folded body is deviation-moved with respect to the holder body, and by the position adjusting unit, the left-right center can be arranged so as to be substantially aligned with the left-right center of the seat, that is, the left-right center of the occupant. As a result, even when the length dimension of the holder body can be adjusted according to the difference in physique and preference of the occupant, the airbag can be inflated with its left-right center substantially aligned with the left-right center of the occupant. As a result, the occupant can be accurately protected by the inflated airbag.

When a seatbelt is provided on the seat to connect a tongue plate, which is a boundary part between a shoulder belt and a lap belt, to a buckle provided on the seat side when worn, the holder may be configured such that the movable side end is connected to the seat by using (sharing) the buckle of the seat belt.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 3 is a front view of the seat of FIG. 1;

DETAILED DESCRIPTION OF THE INVENTION

Figure 1:
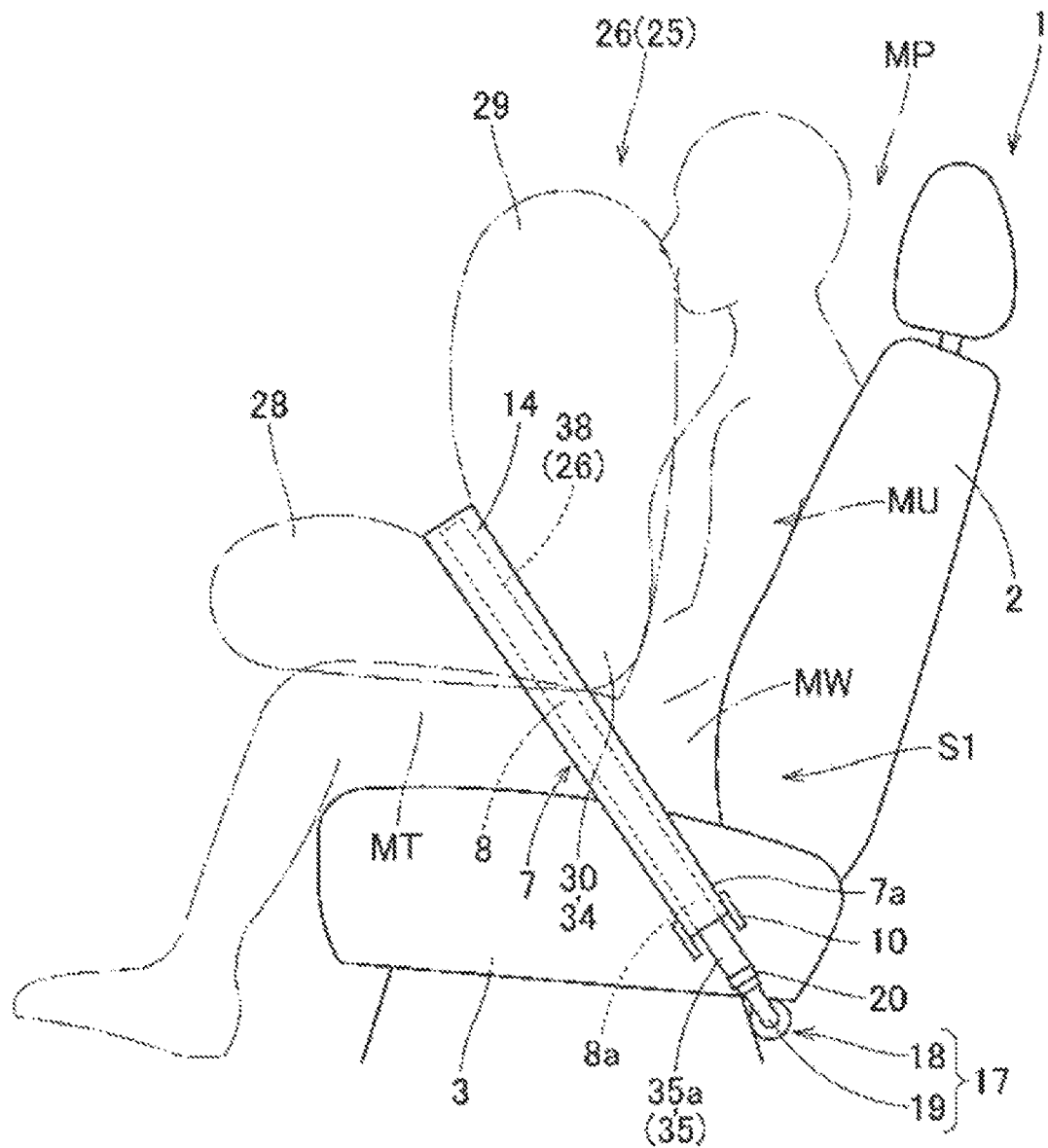
FIG. 1 is a side view of a seat in which an occupant protection device according to an embodiment of the invention is mounted and illustrates a state in which the occupant protection device is attached.
Figure 2:
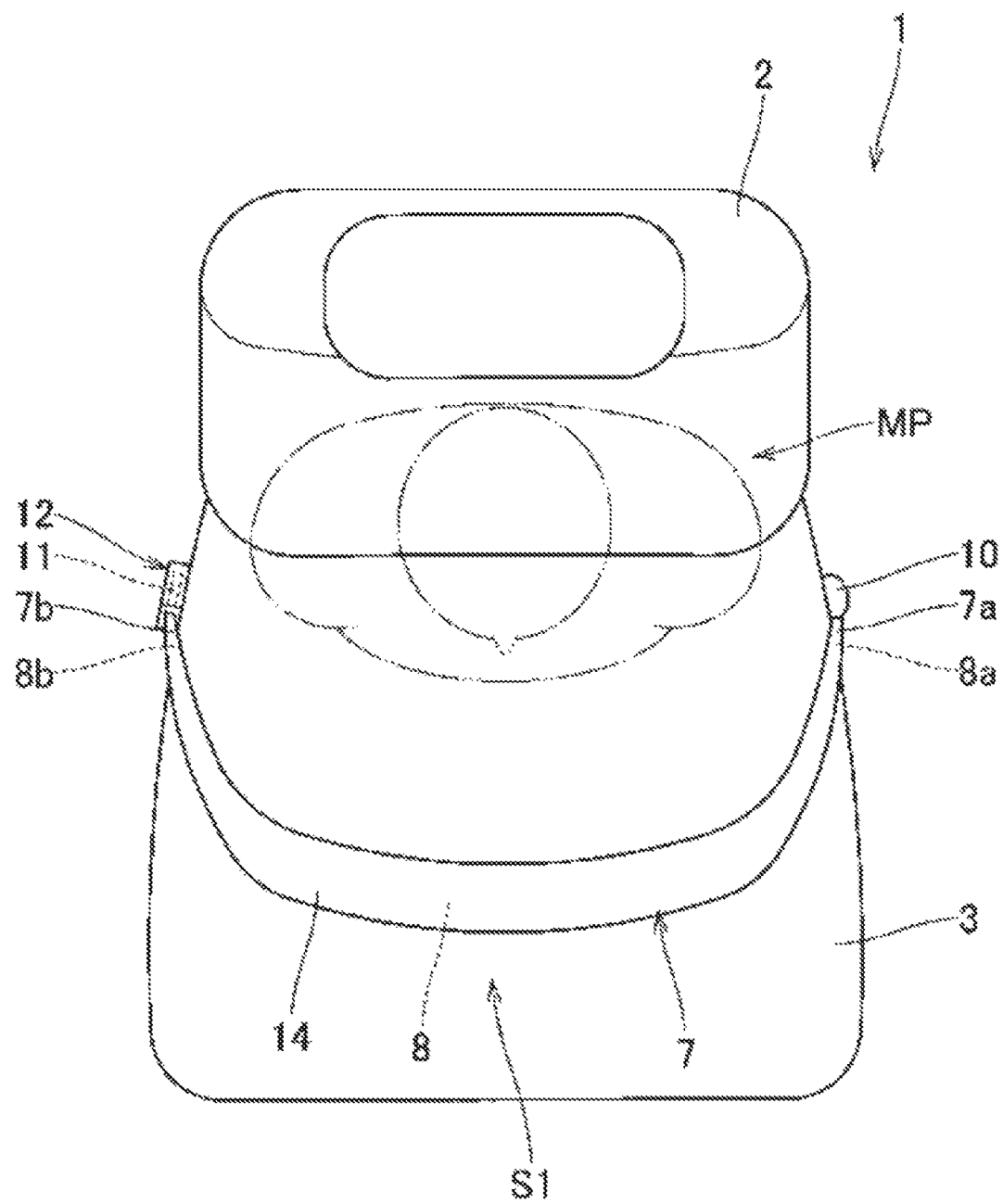
FIG. 2 is a plan view of the seat of FIG. 1.

Hereinafter, an embodiment of the invention will be described with reference to the drawings. As illustrated in FIGS. 1 to 3, an occupant protection device S1 of the embodiment is mounted on a seat 1 of a vehicle and is configured to include a holder 7, an airbag 25, and an inflator 17. The seat 1 includes a backrest portion 2 and a seat portion 3.

As illustrated in FIGS. 1 to 3, 6, and 7, the holder 7 is arranged so as to surround (front side) a waist MW of an occupant MP seated on the seat 1 at the time of wearing. The holder 7 is connected to a left side surface side of the seat 1 with one end side (in the case of the embodiment, a left end side) as a fixed side end 7a and can be connected to a right side surface side of the seat 1 with the other end side (right end side) as a movable side end 7b. In the case of the embodiment, as illustrated in FIG. 3, the holder 7 includes a holder body 8 formed of synthetic resin, metal, or the like which is a material having shape retention and a cover body 14 which covers the periphery of the holder body 8. Specifically, the holder body 8 is configured as a substantially plate shape curved in a substantially U shape. Further, the holder body 8 has a configuration in which a fixed side end 8a and a movable side end 8b are respectively connected on the left side surface side and the right side surface side of the seat 1 near a boundary portion between the backrest portion 2 and the seat portion 3. The fixed side end 8a of the holder body 8 is connected to the left side surface side of the seat 1 by using a hinge 10 so that the holder body 8 can pivot with respect to the seat 1 (see the alternate long and short dash line in FIG. 3). A tongue plate 11 which can be connected to a buckle 12 arranged on the right side surface side of the seat 1 is arranged at the movable side end 8b of the holder body 8 (see FIGS. 2 and 3). Further, the length dimension of the holder body 8 is set to a dimension in which, when the inflation of the airbag 25 is completed, it is possible to secure a space for arranging an inflated cross-inflation portion 30 (waist receiving portion 34) between the waist MW of the occupant MP and the holder body 8 and a large gap is not generated between the inflated waist receiving portion 34 and the waist MW. That is, in the occupant protection device S1 of the embodiment, the holder body 8 (holder 7) is arranged in a state where, when the tongue plate 11 is connected (movable side end 8b (7b) is connected to the right side surface side of the seat 1) and attached to the buckle 12, a gap is provided between the waist MW and the holder body 8 (holder 7) around a front side of the waist MW of the occupant MP seated in seat 1. The cover body 14 is arranged so as to cover the periphery of the holder body 8, a folded body 38 in which a bag body 26 of the airbag 25 is folded, and a gas supply path portion 35. The cover body 14 is configured to be breakable when the airbag 25 is developed and inflated. That is, in the case of the embodiment, the folded body 38 (folded bag body 26) and the gas supply path 35 in the airbag 25 are surrounded by the cover body 14 and integrated with the holder body 8.

The inflator 17 is on the seat 1 side, and specifically, is arranged on the back side below the seat portion 3 in the seat 1 (see FIG. 1). The inflator 17 includes a substantially columnar inflator body 18 (detailed illustration is not shown) arranged so as to substantially align an axial direction in a left-right direction, and a pipe portion 19 extending from the inflator body 18 and supplying inflation gas to the airbag 25. The pipe portion 19 extends from the inflator body 18 and is arranged so that a tip thereof is located on the left side of the seat 1 near a boundary portion between the seat portion 3 and the backrest portion 2. The pipe portion 19 is configured such that the tip is connected to the gas supply path portion 35 in the airbag 25 by using a clamp 20 (see FIG. 1).

The airbag 25 is in the shape of a bag composed of a flexible seat body. In the case of the embodiment, the airbag 25 is arranged so as to be folded in a long shape and overlapped with an inner peripheral surface side of the holder body 8 (see FIG. 3). As described above, the airbag 25 and the holder body 8 are integrated by being covered with the cover body 14 which can be broken when the airbag 25 is developed and inflated.

Figure 4:
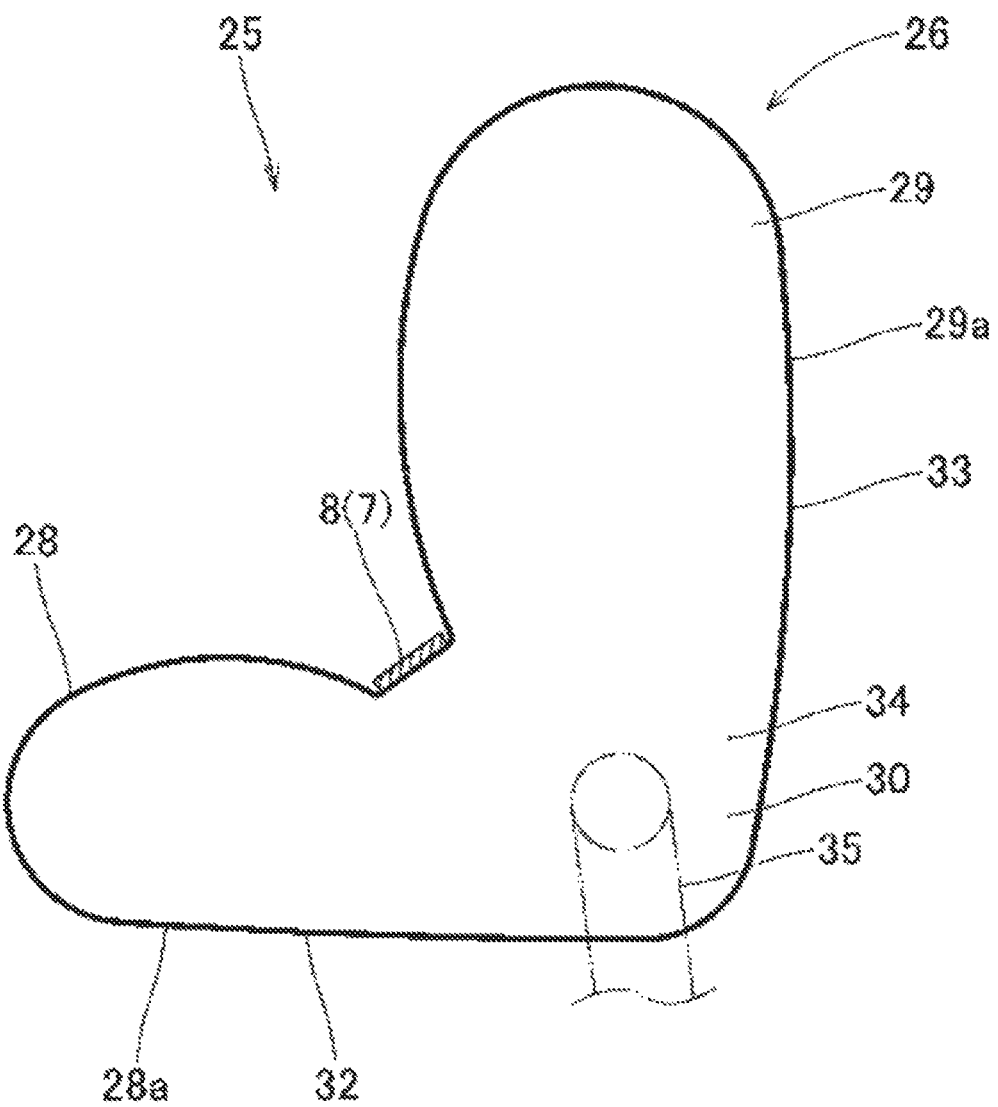
FIG. 4 is a schematic vertical cross-sectional view substantially along a front-rear direction in a state in which an airbag used in the occupant protection device of the embodiment is inflated by itself.
Figure 5:
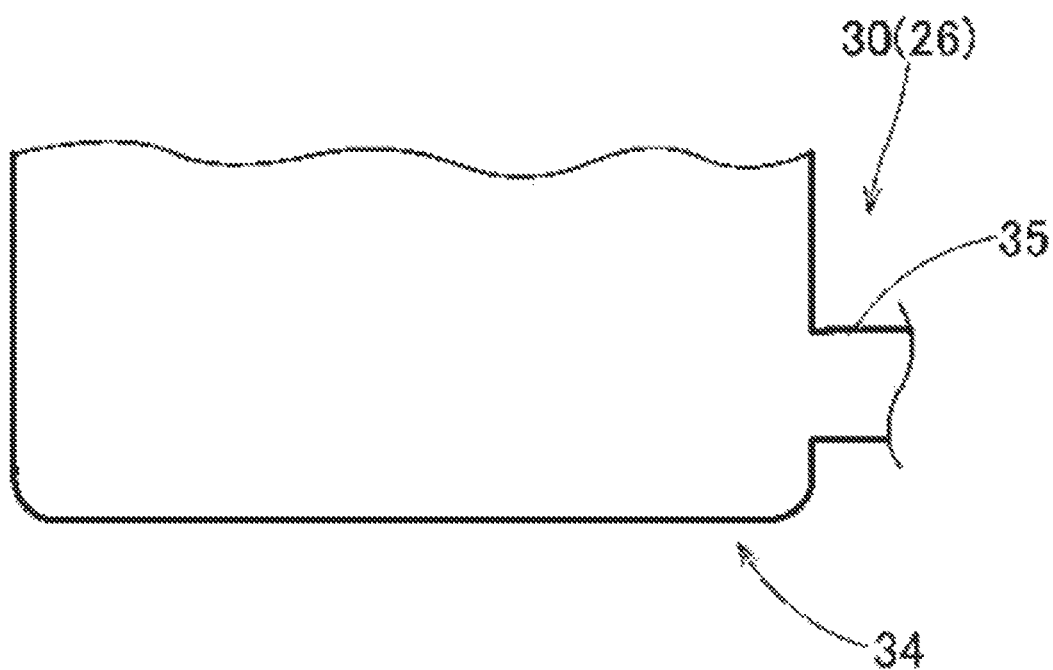
FIG. 5 is a schematic partially enlarged vertical cross-sectional view of the airbag of FIG. 5 substantially along a left-right direction.

As illustrated in FIGS. 4 and 5, the airbag 25 includes the bag body 26 and the gas supply path portion 35 connected to the inflator 17 to allow inflation gas to flow into the bag body 26.

Figure 6:
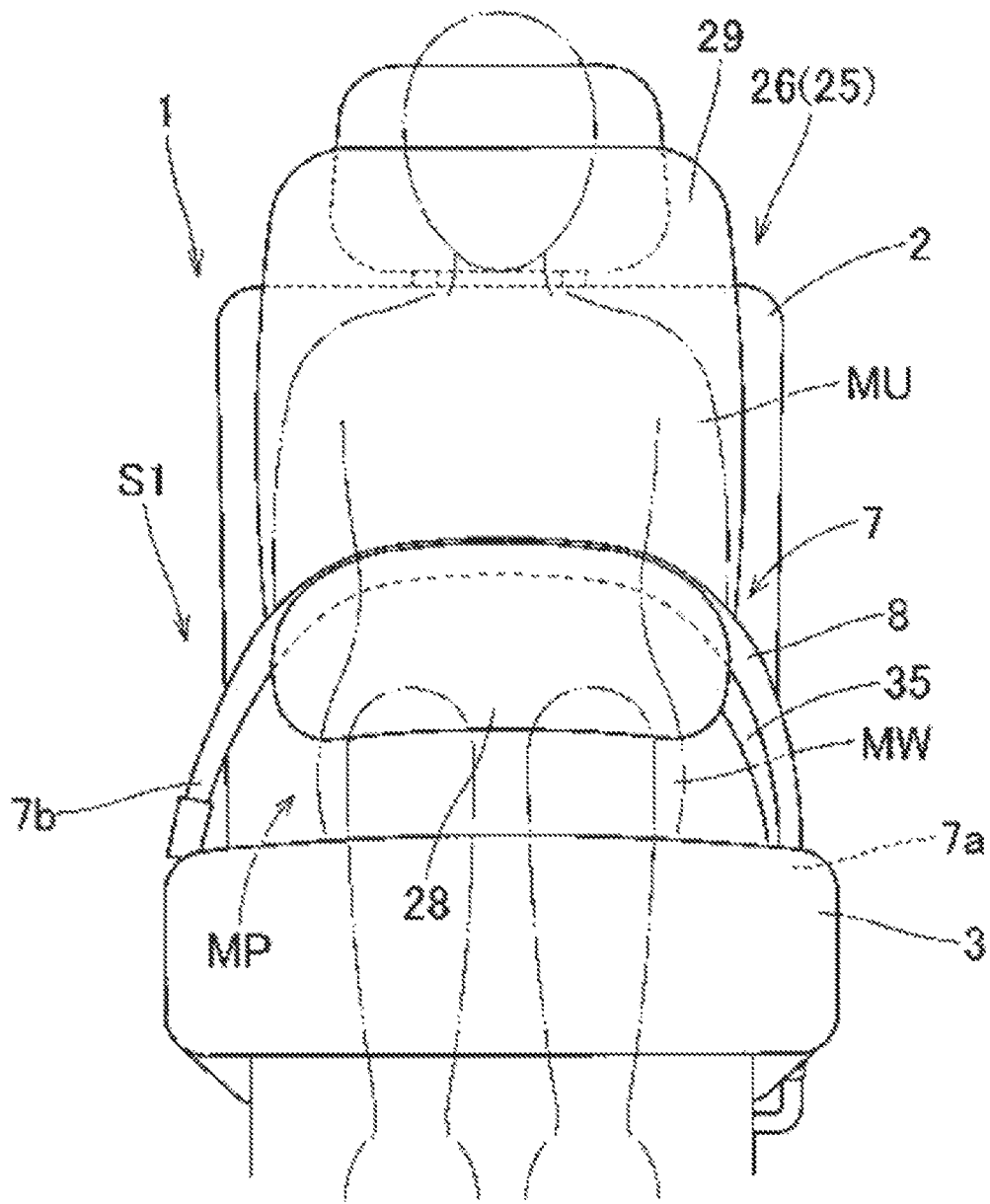
FIG. 6 is a front view of a seat in a state in which the airbag completes inflation in the occupant protection device of the embodiment.
Figure 7:
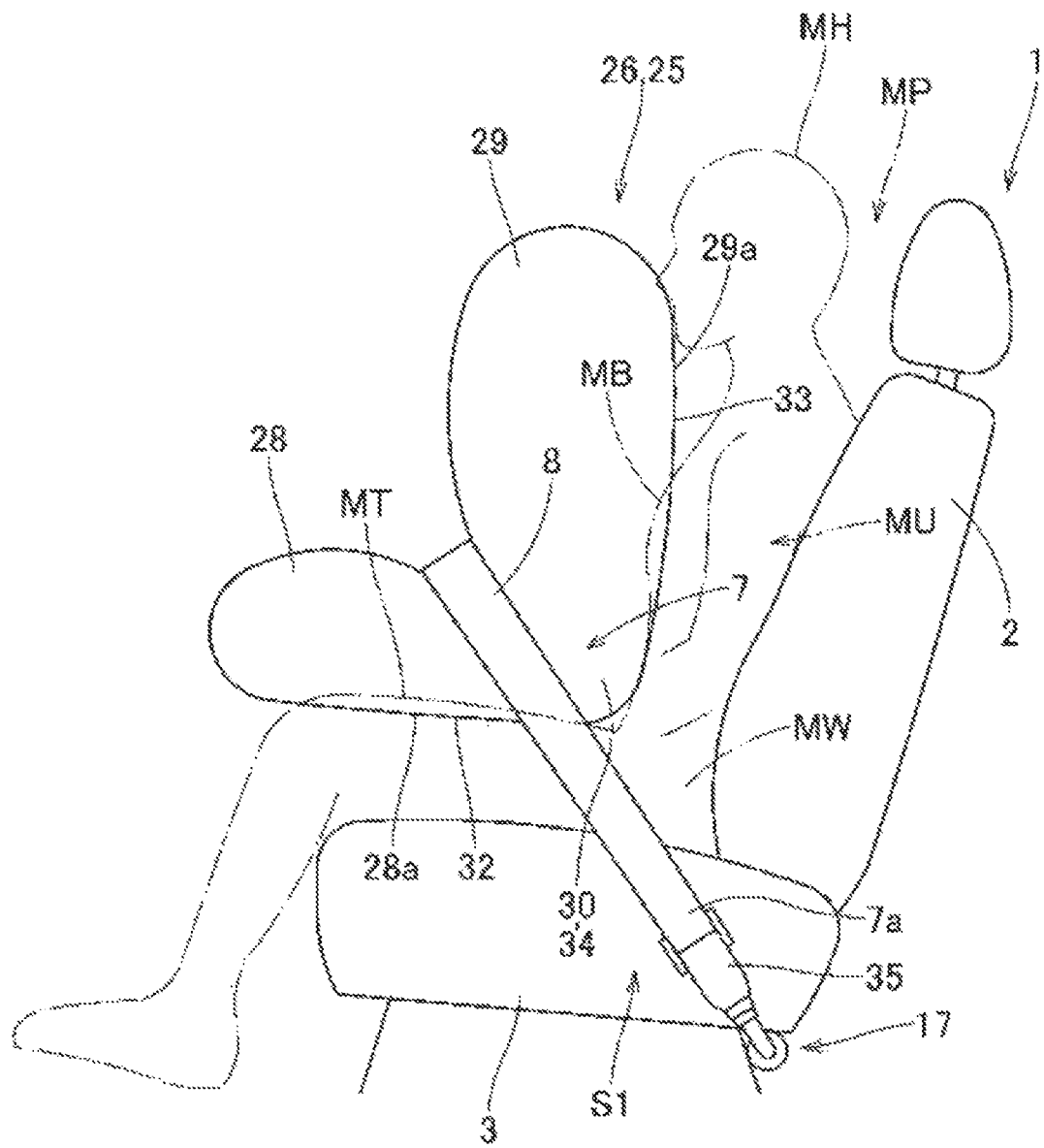
FIG. 7 is a side view of the seat in the state in which the airbag completes inflation in the occupant protection device of the embodiment.

The bag body 26 is arranged so as to be overlapped on the inner peripheral surface side of the holder body 8 in the state of the folded body 38 folded in a long shape (see FIG. 3). The bag body 26 is inflated so as to expand toward the occupant MP side while inflowing the inflation gas into the inside and protruding from the holder. Also, when the inflation is completed, as illustrated in FIGS. 6 and 7, the bag body 26 is configured to cover the occupant MP from an upper surface of a thigh MT to a front surface of an upper body MU. When the inflation is completed, the bag body 26 includes a lower inflation portion 28 covering the upper surface of the thigh MT of the occupant MP, an upper inflation portion 29 covering the front surface of the upper body MU of the occupant MP, and the cross-inflation portion 30 arranged between the lower inflation portion 28 and the upper inflation portion 29. The shape at the time of completion of inflation is configured to be substantially L-shaped when viewed from the left and right sides. In this bag body 26, a lower surface 28a of the lower inflation portion 28 forms a thigh abutment surface 32 capable of contacting the upper surface of the thigh MT of the occupant MP when inflation is completed and a rear surface 29a of the upper inflation portion 29 is arranged in front of the upper body MU of the occupant MP when the inflation is completed and forms an upper body restraint surface 33 capable of restraining the occupant MP from a chest MB to a head MH. Further, in the bag body 26 of the embodiment, the cross-inflation portion 30 forms the waist receiving portion 34 which receives the waist MW of the occupant MP when the inflation is completed. Then, in the airbag 25 of the embodiment, when the inflation is completed, the cross-inflation portion 30 (waist receiving portion 34) in the bag body 26 is arranged between the holder body 8 and the waist MW of the occupant MP (see FIG. 7). The bag body 26 is arranged so that the left-right center at the completion of inflation is substantially aligned with the left-right center of the seat 1. The width of the bag body 26 in the left-right direction in the inflated state is set to a dimension where the upper body MU of the occupant MP can be covered over substantially the entire left and right surfaces (see FIG. 6).

The gas supply path portion 35 is arranged so as to extend toward the fixed side end 7a side (left end side) of the holder 7 (see FIG. 6). Specifically, in the case of the embodiment, the gas supply path portion 35 has a substantially tubular shape and extends from the left side surface side of the cross-inflation portion 30 in the bag body 26 along the left-right direction so as to substantially follow the holder body 8 (see FIGS. 4 and 5). In the gas supply path portion 35, a tip 35a side is connected to the pipe portion 19 of the inflator 17 by using clamp 20 as described above so as to guide the inflation gas discharged from the inflator body 18 into the bag body 26. The length dimension of the gas supply path portion 35 is set to a dimension where, when the inflation of the airbag 25 is completed, the left-right center of the bag body 26 can be placed so as to be substantially aligned with the longitudinal center (center of the seat 1 in the left-right direction) of the holder body 8.

In the occupant protection device S1 of the embodiment, the tongue plate 11 arranged on the movable side end 7b (right end) side of the holder 7 is inserted into the buckle 12 provided on the right side surface side of the seat 1 so as to place the holder 7 around the waist MW of the occupant MP seated in the seat 1 and the movable side end 7b of the holder 7 is connected to the right side surface side of the seat 1, in such a manner that the occupant protection device S1 can be mounted. Then, when the inflator 17 is operated in a state where the occupant MP seated in the seat 1 wears the occupant protection device S1, the inflation gas discharged from the inflator 17 flows into the bag body 26 via the gas supply path portion 35 and the bag body 26 protrudes rearward and downward from the holder body 8 to the occupant MP side so as to break the cover body 14. As a result, the inflation is completed as illustrated in the alternate long and short dash lines in FIGS. 1 and 3 and FIGS. 6 and 7.

The occupant protection device S1 of the embodiment has a configuration in which the holder 7 which accommodates and holds the folded airbag 25 is arranged in front of the waist MW of the occupant MP seated on the seat 1 at the time of wearing and the airbag 25 has a configuration in which the inflation gas flows into the inside when the inflator 17 is operated and the airbag 25 inflates while protruding from the holder 7 toward the occupant MP side. Then, when the inflation of the airbag 25 is completed, the cross-inflation portion 30 (waist receiving portion 34) arranged between the upper inflation portion 29 and the lower inflation portion 28 is arranged between the holder 7 (holder body 8) and the waist MW. That is, in the occupant protection device S1 of the embodiment, when the inflation of the airbag 25 is completed, the lower inflation portion 28 covering the upper surface of the thigh MT, the upper inflation portion 29 covering the front surface of the upper body MU, and the cross-inflation portion 30 (waist receiving portion 34) placed between the lower inflation portion 28 and the upper inflation portion 29 are configured to be arranged so as to cover a wide area from the upper surface of the thigh MT to the front surface of the upper body MU, including the front surface of the waist MW. As a result, in the occupant protection device S1 of the embodiment, when the inflation is completed, the airbag 25 is configured to be arranged so as to cover from the upper surface of the thigh MT of the occupant MP, through the waist MW, to the front surface of the upper body MU directly by the inflation portion itself having cushioning properties, with almost no gap. As a result, the waist MW can be accurately restrained.

Therefore, in the occupant protection device S1 of the embodiment, the waist MW of the occupant MP can be accurately restrained by the airbag 25 which has completed the expansion.

Further, in the occupant protection device S1 of the embodiment, since the holder body 8 in the holder 7 is formed of a material having shape retention and is curved in a substantially U shape, the separation distance between the holder 7 and the occupant MP when the movable side end 7b (8b) is connected (mounted) to the side surface side of the seat 1 can be kept substantially constant. In addition, when such a point is not taken into consideration, a holder body 46 in a holder 45 may be formed from a strip-shaped body having flexibility, as shown in an occupant protection device S2 illustrated in FIGS. 8 and 9.

Figure 8:
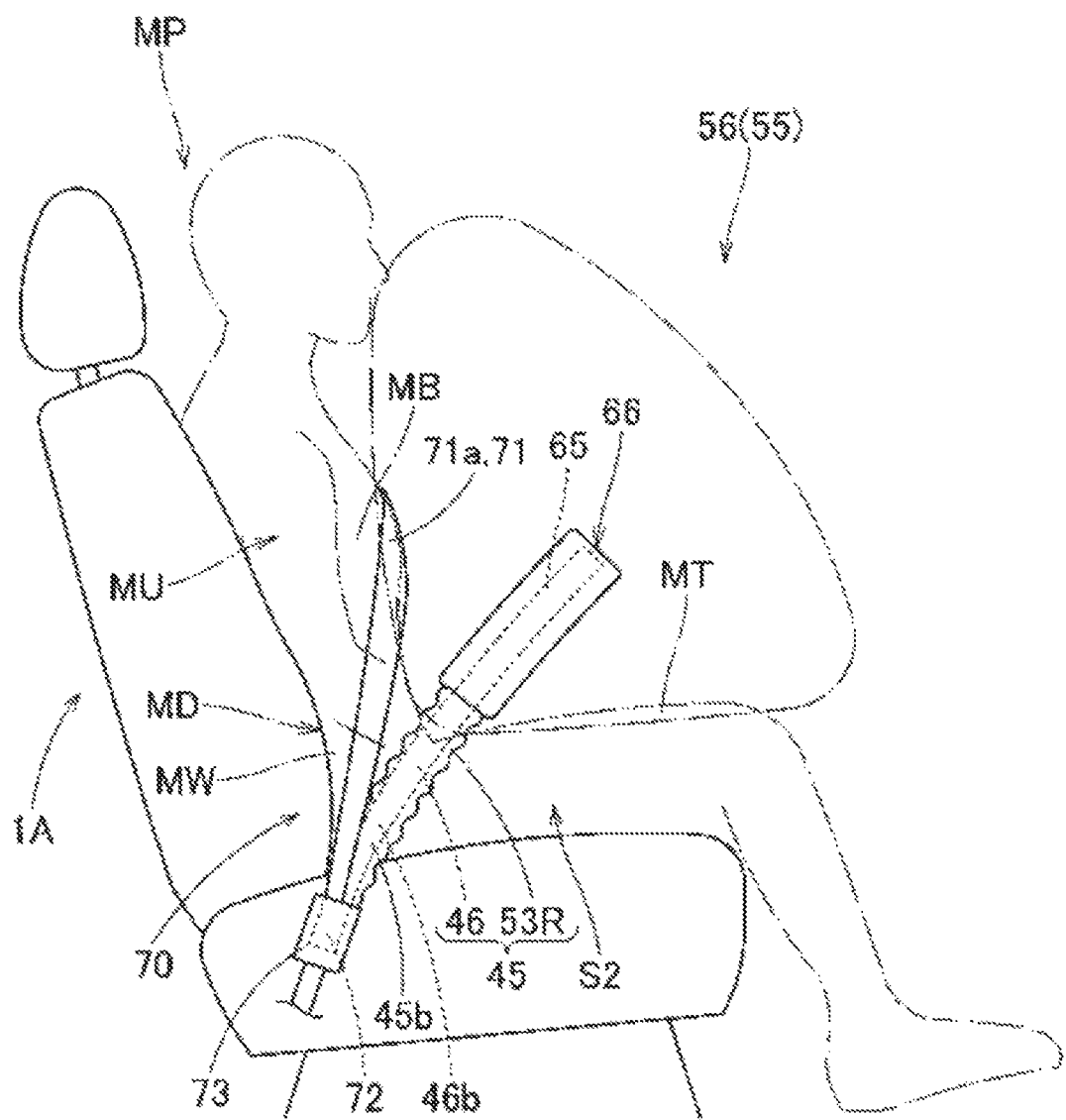
FIG. 8 is a side view of a seat in which an occupant protection device of another embodiment of the invention is mounted and illustrates a state in which the occupant protection device is attached.
Figure 9:
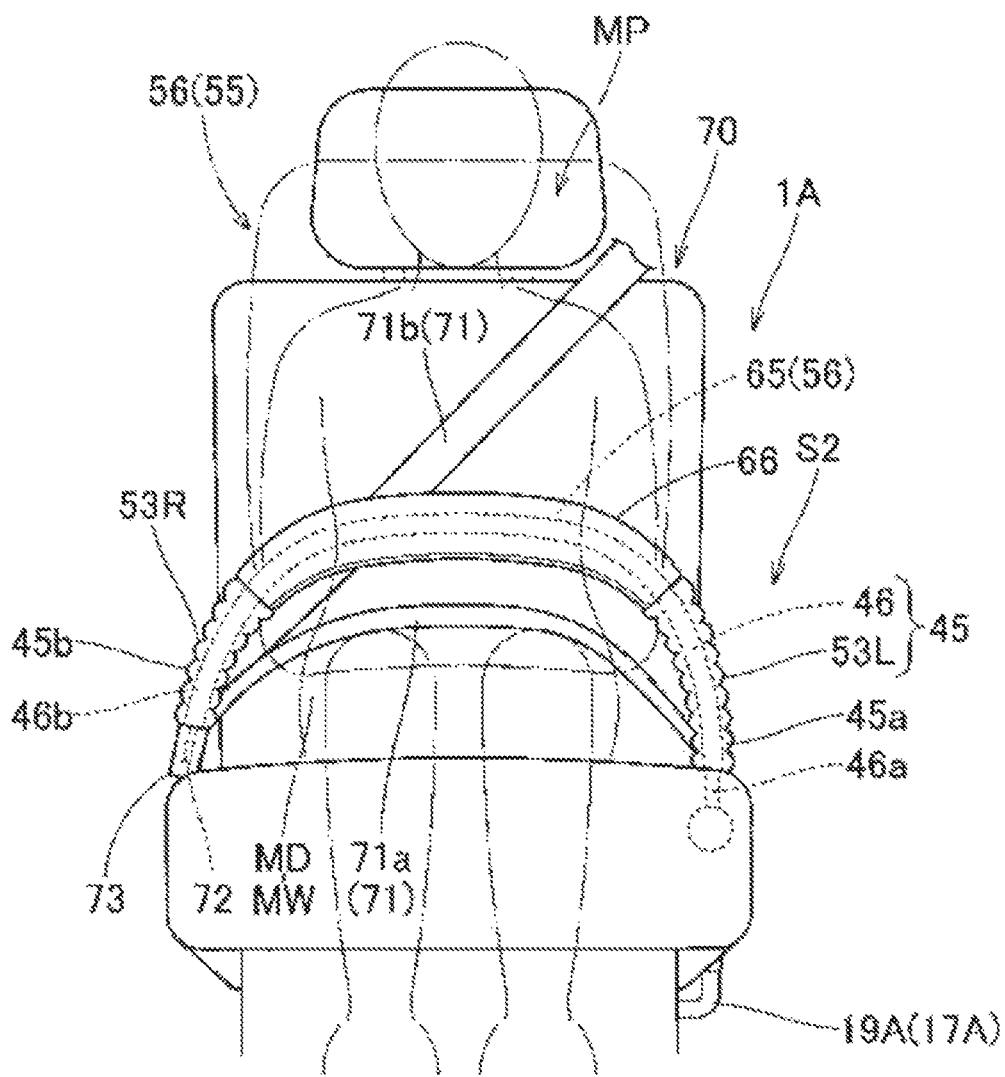
FIG. 9 is a front view of the seat of FIG. 8.

Next, the occupant protection device S2 of another embodiment will be described. As illustrated in FIGS. 8 and 9, the occupant protection device S2 is mounted on a seat 1A provided with a seat belt 70 and is configured to include a holder 45, an airbag 55, and an inflator 17A. In this occupant protection device S2, since the inflator 17A has substantially the same configuration as that of the inflator 17 in the occupant protection device S1 described above, an "A" is added to the end of the same diagram code, and detailed description thereof will be omitted.

The seat belt 70 includes a belt body 71 for restraining the occupant MP seated on the seat 1A, a tongue plate 72 attached to the belt body 71, and a buckle 73 for connecting the tongue plate 72. In the belt body 71, one end is locked to a take-up shaft of a retractor (not illustrated) arranged in a member on the vehicle body side (not illustrated) on the left side of the seat 1A and the other end side is locked to an anchor member (not illustrated) arranged on the left side of the rear end of the seat portion 3 in the seat 1A. The belt body 71 includes a lap belt 71b which restrains a lower body MD (waist MW) of the occupant MP when mounting in a state where the tongue plate 72 is connected to the buckle 73 and a shoulder belt 71a which restrains the upper body MU (from a shoulder to the chest MB) of the occupant MP (see FIGS. 8 and 9).

The holder 45 is configured to include the holder body 46 formed of a flexible strip and a position adjusting unit 53L and 53R which partially cover the outer peripheral side of the holder body 46. Similar to the holder 7 in the occupant protection device S1 described above, the holder 45 is arranged so as to surround (front side) the waist MW of the occupant MP seated on the seat 1 at the time of mounting. In the holder 45, one end side (in the case of the embodiment, the left end side) is connected to the left side surface side of the seat 1 as a fixed side end 45a and the other end side (right end side) can be connected to the right side surface side of the seat 1 as a movable side end 45b.

Figure 13:
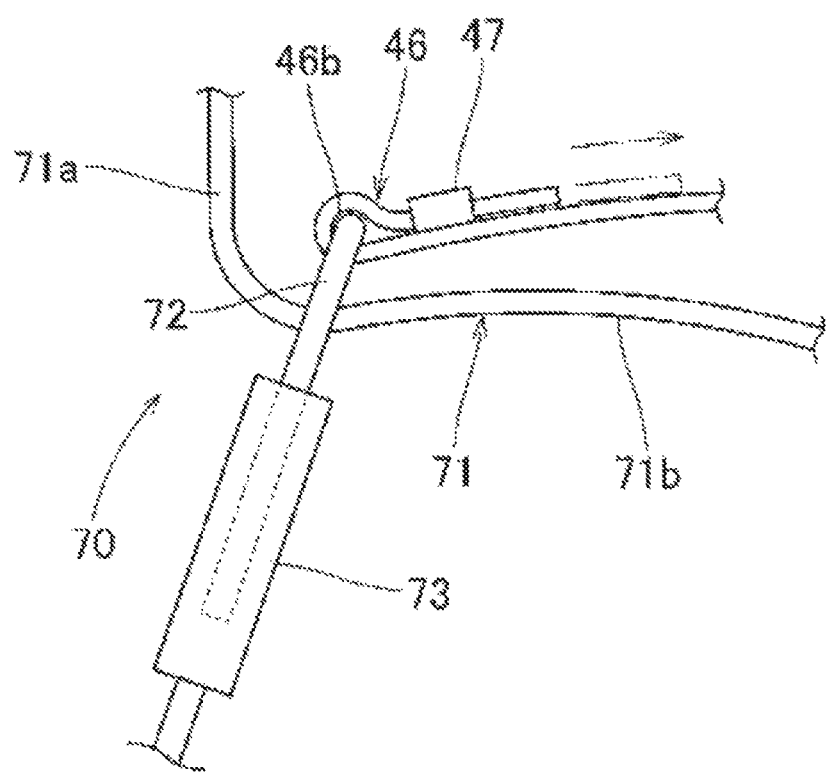
FIG. 13 is a schematic partially enlarged view illustrating a portion between a buckle of a seat belt and a movable side end of a holder body in the occupant protection device illustrated in FIG. 8.

In the embodiment, the holder body 46 is formed of a strip-shaped body having the same flexibility as that of the belt body 71 of the seat belt 70. The holder body 46 is configured such that the length dimension can be adjusted by disposing a length adjusting mechanism 47 between a fixed side end 46a and a movable side end 46b. In the case of the embodiment, the length adjusting mechanism 47 is arranged at a position near the movable side end 46b on the holder body 46 and is composed of a retaining annular body whose folding length from the tongue plate 72, which will be described below, can be adjusted (see FIG. 13). The holder body 46 has a configuration in which the movable side end 46b side, which is the right end side, is connected to the tongue plate 72 provided on the seat belt 70 in the case of the embodiment. The movable side end 46b of the holder body 46 is connected to the right side surface of the seat 1 together with the belt body 71 by using the tongue plate 72 and the buckle 73 of the seat belt 70 (see FIG. 13). The holder body 46 is configured so that the length dimension can be adjusted by the length dimension adjusting mechanism 47. However, when mounting, it is necessary for the holder body 46 to set the length dimension to a dimension where, when the inflation of the airbag 55 is completed, a space for arranging a waist receiving portion 59 forming a cross-inflation portion 63 can be secured between the holder body 46 and the waist MW and a large gap is not generated between the inflated waist receiving portion 59 and the waist MW. That is, in the occupant protection device S2 of the embodiment, the holder 45 (holder body 46) is attached to the waist MW of the occupant MP in a somewhat slack state. Also, in the embodiment, for the sake of explanation, the folded body 65 and the cover body 66, which will be described below, are illustrated so as to float from the waist MW with a gap between them and the waist MW (see FIGS. 8 and 9). However, actually, the occupant protection device S2 will be mounted in a state where the holder body 46 is slackened around the waist MW and the folded body 65 and cover body 66 are placed on the thigh MT of the occupant MP.

Figure 11:
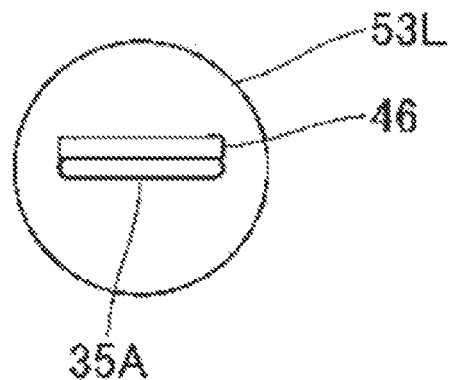
FIG. 11 is a partially enlarged schematic cross-sectional view illustrating a portion of a position adjusting unit in the occupant protection device illustrated in FIG. 8.
Figure 12:
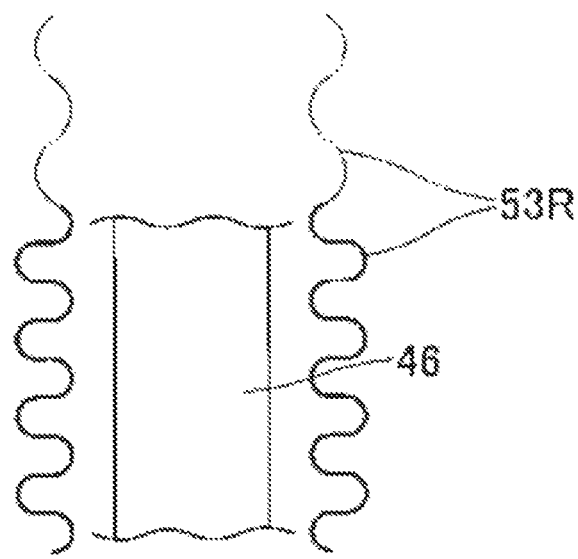
FIG. 12 is a partially enlarged schematic vertical cross-sectional view illustrating the portion of the position adjusting unit in the occupant protection device illustrated in FIG. 8.

The position adjusting unit 53L and 53R are arranged at positions between the folded body 65 and the fixed side end 46a and the movable side end 46b of the holder body 46 on both the left and right sides of the folded body 65 (cover body 66) formed by folding a bag body 56 in the airbag 55. The position adjusting unit 53L and 53R are capable of adjusting the position of the folded body 65 with respect to the occupant MP in a direction along the holder body 46 when mounted. In the case of the embodiment, the position adjusting unit 53L and 53R are formed of a rubber-like elastic body and are configured to have a substantially bellows tube shape which can be expanded or contracted by exhibiting the same repulsive force. Also, the position adjusting unit 53L and 53R are configured so that the folded body 65 cannot be inserted and the holder body 46 or the holder body 46 and a gas supply path portion 35A can be inserted (see FIGS. 11 and 12). Specifically, on the left side of the folded body 65, the position adjusting unit 53L covers the outer peripheral side of the holder body 46 and the gas supply path portion 35A between the folded body 65 and the fixed side end 46a and is arranged so that both ends thereof are brought into contact with the folded body 65 and a stopper (not illustrated) provided on the fixed side end 46a side. On the right side of the folded body 65, the position adjusting unit 53R covers the outer peripheral side of the holder body 46 between the folded body 65 and the movable side end 46b and is arranged so that both ends thereof are brought into contact with the folded body 65 and a stopper (not illustrated) provided on the movable side end 46b side. Both ends of each of the position adjusting unit 53L and 53R are supported by the folded body 65 or the holder body 46 side. Therefore, when the holder body 46 is mounted so as to surround the front side of the waist MW of the occupant MP seated on the seat 1A with the length dimension adjusted, the position adjusting unit 53L and 53R are respectively expanded or contracted. Thus, as will be described below, the position adjusting unit 53L and 53R are configured to be able to adjust the position such that the position of the folded body 65 arranged so as to be deviation-movable with respect to the holder body 46 is adjustable so that the left-right center thereof is substantially aligned with the approximately left-right center (approximately left-right center of the occupant MP who wears the device) of the seat 1A (see FIG. 9).

The airbag 55 includes the bag body 56 and the gas supply path portion 35A which is connected to the inflator 17 to allow inflation gas to flow into the bag body 56. The gas supply path portion 35A has the same configuration as the gas supply path portion 35 in the airbag 25 described above and is formed so as to extend from the left side surface side of the waist receiving portion 59, which will be described below, along the left-right direction so as to substantially follow the holder body 46.

Figure 14:
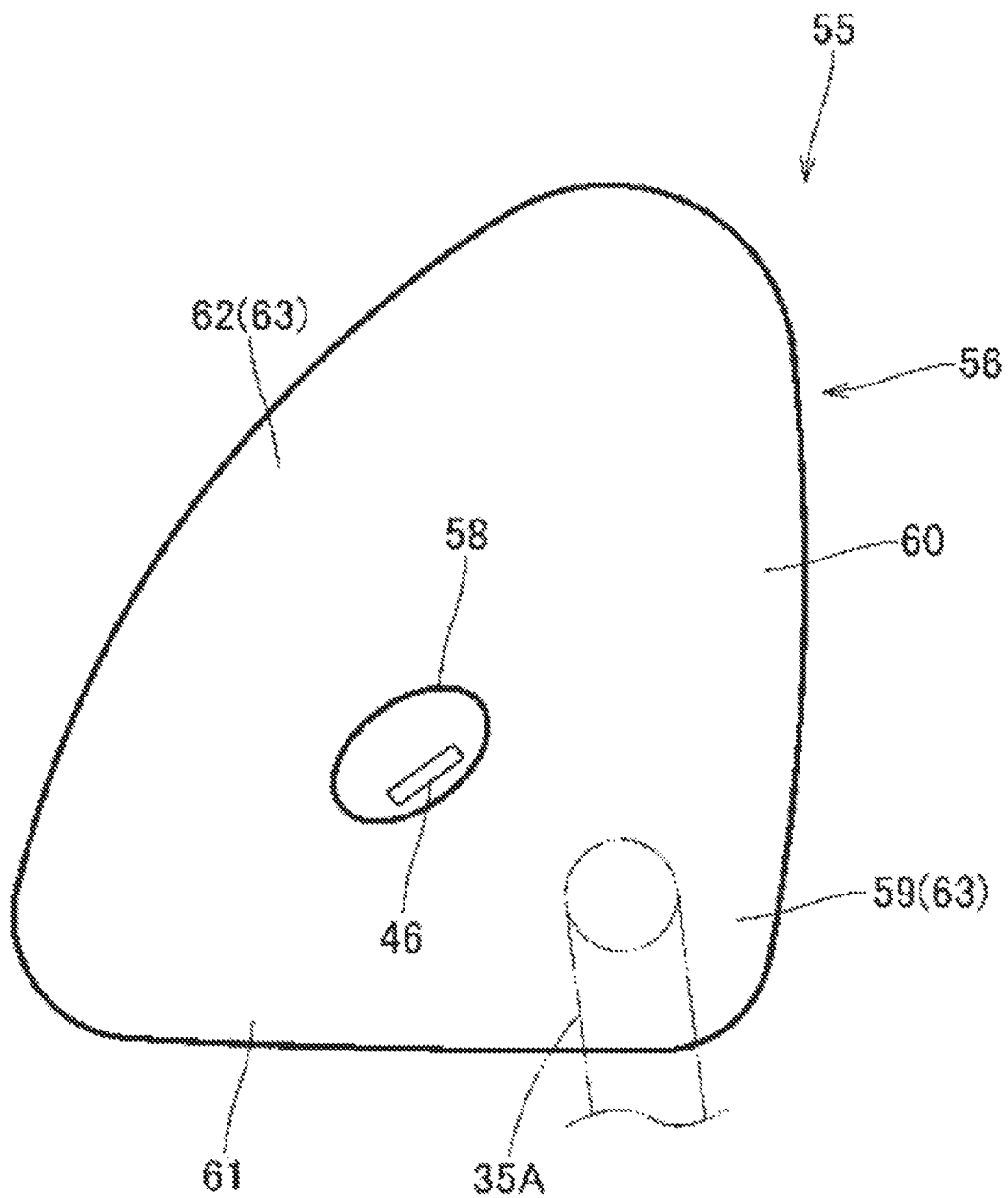
FIG. 14 is a schematic vertical cross-sectional view substantially along the front-rear direction in a state in which an airbag used in the occupant protection device illustrated in FIG. 8 is inflated by itself.
Figure 15:
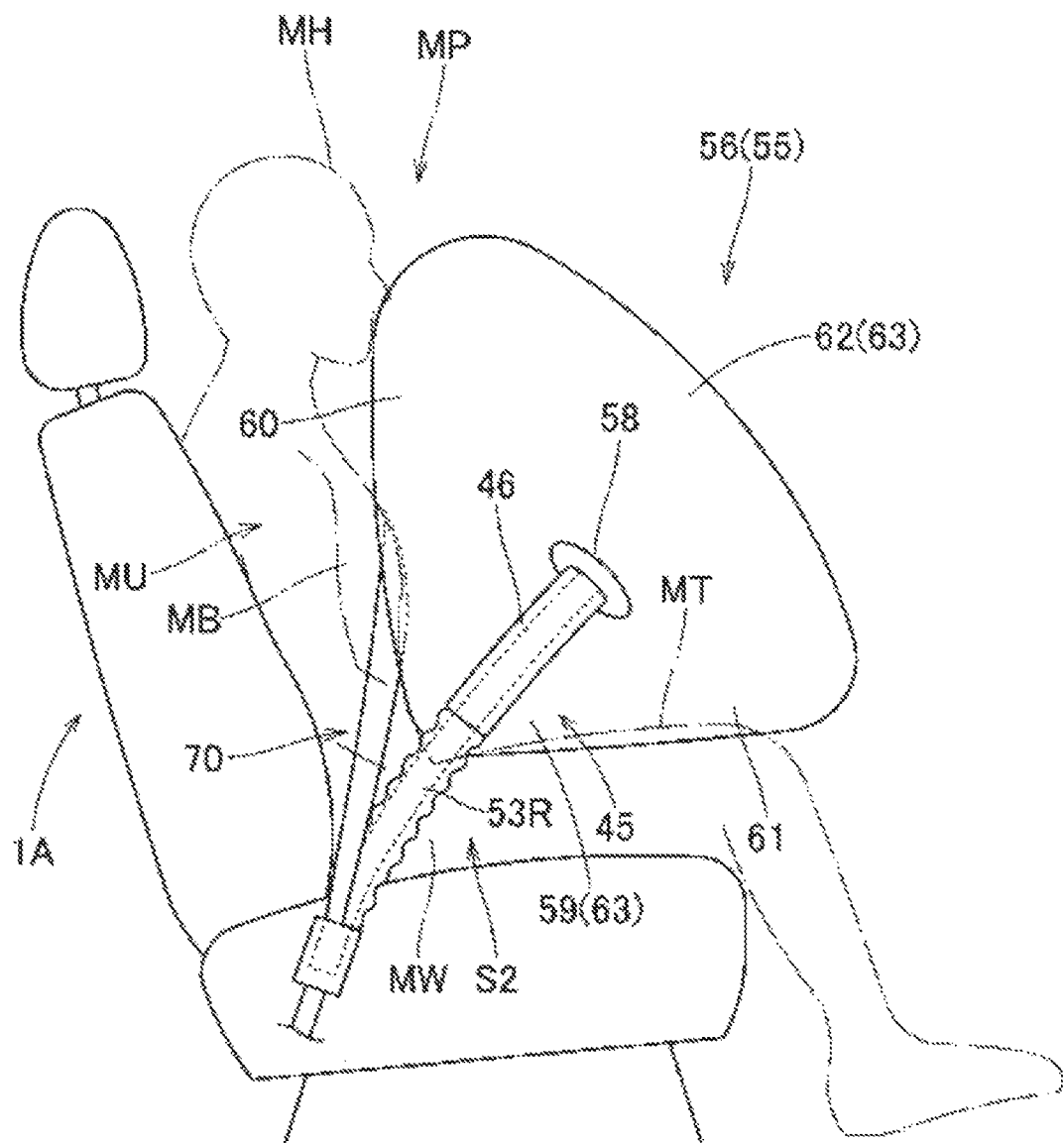
FIG. 15 is a side view of the seat in the occupant protection device illustrated in FIG. 8 in a state where the airbag completes inflation.
Figure 16:
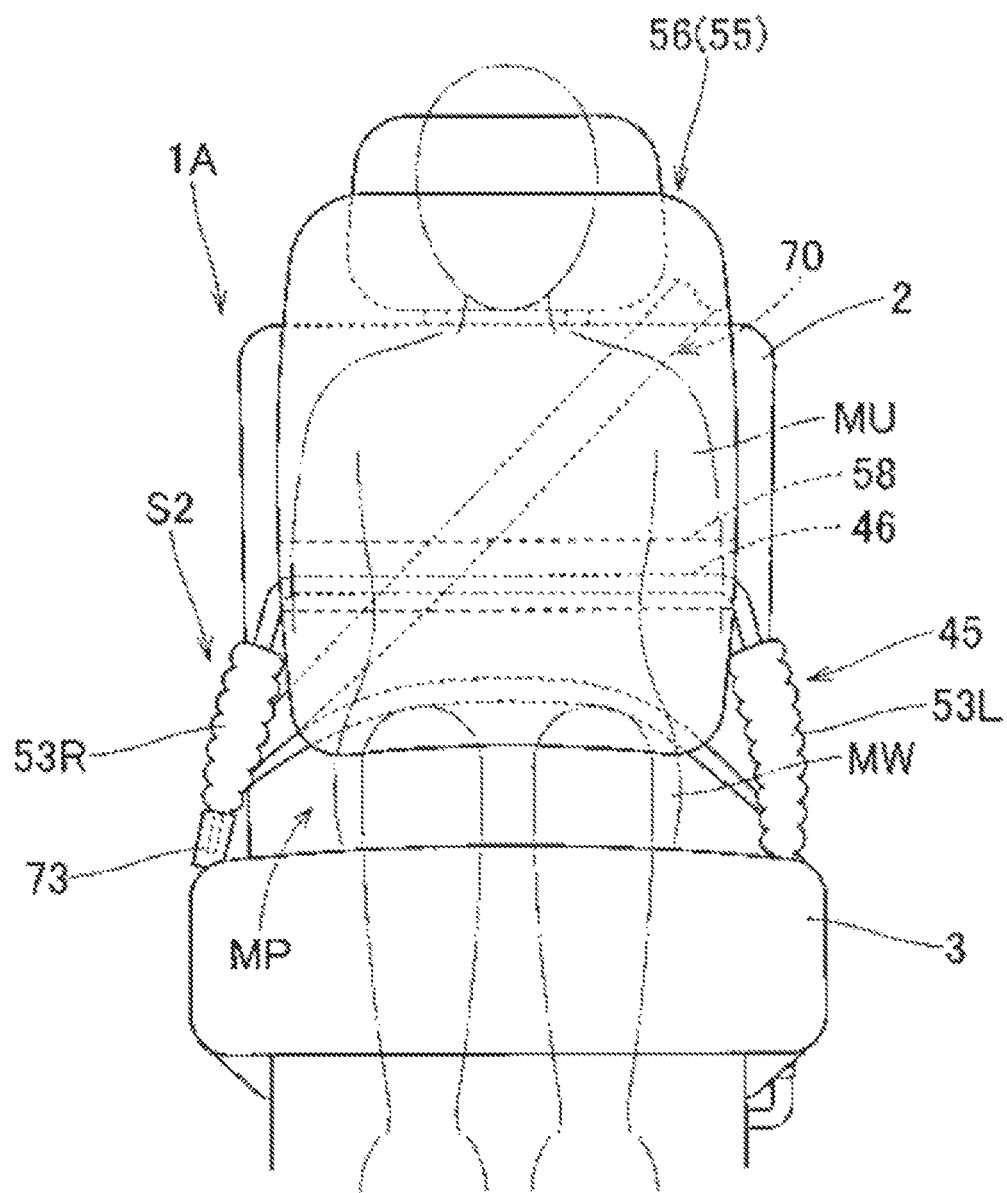
FIG. 16 is a front view of the seat in the occupant protection device illustrated in FIG. 8 in the state where the airbag completes inflation.

In the case of the embodiment, the external shape of the bag body 56 when the inflation is completed has a substantially triangular prism shape in which the axial direction is substantially along the left-right direction (see FIGS. 14 to 16). To be described in detail, the bag body 56 has a substantially right-angled triangular shape having a hypotenuse on the front side in an inflation completed shape when viewed from the left and right sides. Further, in the bag body 56, a through-hole portion 58 through which the holder body 46 can be inserted is formed so as to penetrate in the left-right direction when the inflation is completed (see FIG. 16). Specifically, when the bag body 56 at the completion of inflation is viewed from the left and right sides, the through-hole portion 58 is formed at a position slightly rearward of the front-rear center and slightly below the vertical center.

Then, in the bag body 56 of the embodiment, the region (region on the rear and lower side of the through-hole portion 58) on the rear lower end side at the time of completion of inflation is arranged between the holder body 46 and the waist MW of the occupant MP to form the waist receiving portion 59 which receives the waist MW of the occupant MP. Also, in the bag body 56, a region extending upward from the waist receiving portion 59 forms an upper inflation portion 60 covering the front surface of the upper body MU of the occupant MP and a region extending forward from the waist receiving portion 59 forms a lower inflation portion 61 covering the upper surface of the thigh MT of the occupant MP when the inflation is completed. Further, in the bag body 56 of the embodiment, the region on the front upper side of the through-hole portion 58 at the completion of inflation forms a connecting inflation portion 62 which connects the upper end of the upper inflation portion 60 and the front end of the lower inflation portion 61. Then, in the bag body 56, the waist receiving portion 59 and the connecting inflation portion 62 form the cross-inflation portion 63 arranged between the upper inflation portion 60 and the lower inflation portion 61. The bag body 56 is arranged so that the left-right center when the inflation is completed is substantially aligned with the left-right center of the seat 1A. The width dimension of the bag body 56 in the left-right direction in the inflation completed state is set to a dimension where the upper body MU of the occupant MP can be covered over substantially the entire left and right surfaces (see FIG. 16).

Figure 10:
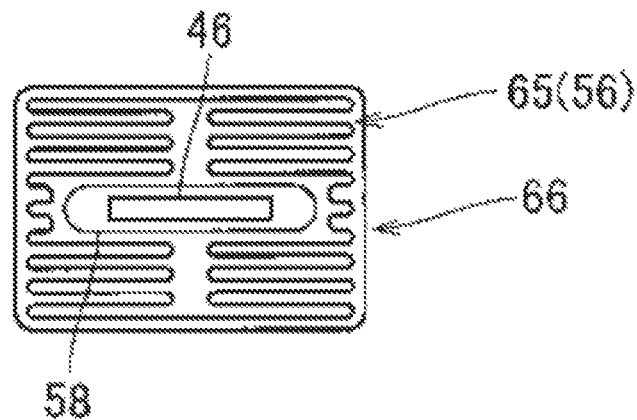
FIG. 10 is a partially enlarged schematic cross-sectional view illustrating a portion of a folding completed body in the occupant protection device illustrated in FIG. 8.

Then, in the embodiment, the bag body 56 is folded so as to cover the periphery of the holder body 46 while maintaining the insertion state of the holder body 46 into the through-hole portion 58 to form the folded body 65. (see FIG. 10). The gas supply path portion 35A is arranged so as to extend from the folded body 65 on an inner peripheral surface side of the holder body 46 (see FIG. 11). The folded body 65 and the gas supply path portion 35A are arranged so as to be deviation-movable with respect to the holder body 46 in a state where the holder body 46 is inserted through the through-hole portion 58. Further, in the embodiment, the periphery of the folded body 65 is covered with the cover body 66 which can be broken when the airbag 55 is developed and inflated, as illustrated in FIG. 10.

In the occupant protection device S2 having such a configuration, when the inflator 17A operates in a state where the occupant MP seated on the seat 1A wears the device, the inflation gas discharged from the inflator 17A flows into the bag body 56 via the gas supply path portion 35A. Therefore, the bag body 56 protrudes from the holder body 46 toward the outer peripheral side including the rear lower part, which is the occupant MP side, so as to break the cover body 66 surrounding the folded body 65, and as illustrated in the alternate long and short dash lines in FIGS. 8 and 9 and FIGS. 15 and 16, the inflation is completed.

Even in the occupant protection device S2 having such a configuration, the airbag 55 has a configuration in which the inflation gas flows into the inside when the inflator 17 is operated and the airbag 55 expands while protruding from the holder body 46 toward the occupant MP side. Then, when the inflation of the airbag 55 is completed, the waist receiving portion 59 (lower part behind the through-hole portion 58) forming the cross-inflation portion 63 is arranged between the holder 45 (holder body 46) and the waist MW. Then, even in the occupant protection device S2 with such a configuration, when the inflation of the airbag 55 is completed, the lower inflation portion 61 covering the upper surface of the thigh MT, the upper inflation portion 60 covering the front surface of the upper body MU, and the waist receiving portion 59 (cross-inflation portion 63) placed between the lower inflation portion 61 and the upper inflation portion 60 are configured to be arranged so as to cover a wide area from the upper surface of the thigh MT to the front surface of the upper body MU, including the front surface of the waist MW. As a result, even in the occupant protection device S2 with such a configuration, when the inflation is completed, the airbag 55 is configured to be arranged so as to cover from the upper surface of the thigh MT of the occupant MP, through the waist MW, to the front surface of the upper body MU directly by the inflation portion itself having cushioning properties, with almost no gap. As a result, the waist MW can be accurately restrained.

Therefore, even in the occupant protection device S2 having the configuration described above, the waist MW of the occupant MP can be accurately restrained by the airbag 55 which has completed inflation.

In particular, in the occupant protection device S2 having the configuration described above, the shape of the bag body 56 when the inflation is completed has a substantially triangular prism shape in which the axial direction is substantially along the left-right direction. In other words, the region (connecting inflation portion 62 forming the cross-inflation portion 63) expanding in front of and above the through-hole portion 58 is configured to connect the upper end of the upper inflation portion 60 and the front end of the lower inflation portion 61. Therefore, even when the occupant MP moves the upper body MU by large extent so as to bring it closer to the lower body MD when the inflation of the airbag 55 is completed, collapse and compression which bring the upper inflation portion 60 closer to the lower inflation portion 61 are suppressed. As a result, the upper body MU of the occupant MP can be accurately restrained by the bag body 56 (airbag 55).

Further, in the occupant protection device S2 having the configuration described above, in the holder 45, the holder body 46 formed from the flexible strip-shaped body has an adjustable length dimension. Therefore, the holder body 46 can be attached by adjusting the length so as not to be slackened significantly with respect to the waist MW of the occupant MP having a different physique. In addition, the position adjusting unit 53L and 53R arranged on the left and right sides of the folded body 65 allow the position of the folded body 65 to be adjusted with respect to the occupant MP when worn. Therefore, even when the holder body 46 is attached by adjusting the length, the folded body 65 is deviation-moved with respect to the holder body 46, and by the position adjusting unit 53L and 53R, the left-right center can be arranged so as to be substantially aligned with the left-right center of the seat 1, that is, the left-right center of the occupant MP (see FIG. 9). As a result, even when the length dimension of the holder body 46 can be adjusted according to the difference in physique and preference of the occupant MP, as illustrated in FIG. 16, the airbag 55 can be inflated with its left-right center substantially aligned with the left-right center of the occupant MP. As a result, the occupant MP can be accurately protected by the inflated airbag 55.

Further, in the occupant protection device S2 having the configuration described above, the holder 45 (holder body 46) is connected to the seat 1A by using (sharing) the movable side end 46b and the buckle 73 of the seat belt 70. Therefore, the increase in the number of parts can be reduced and a simple configuration can be obtained. Needless to say, when such a point is not taken into consideration, the holder may be configured to connect the movable side end to the seat by separately using a connecting member as in the occupant protection device S1 described above. In the embodiment, the holder body 46 winds (intervening the tongue plate 72) the movable end 46b side around the tongue plate 72 of the seat belt 70, in such a manner that the tongue plate 72 and the buckle 73 are shared and connected to the seat 1A. However, the buckle of the seat belt is configured so that two tongue plates can be connected and the movable side end of the holder (holder body) may be configured to be connected to the buckle by using a tongue plate which is separate from the tongue plate for the seat belt.

What is claimed is:

1. An occupant protection device which protects an occupant seated in a seat, comprising:
    an airbag which is folded and accommodated as a bag shape made of a flexible sheet body; and
    a holder configured to accommodate and hold the folded airbag, wherein:
    the holder is a long body where one end side is set as a fixed side end and is connected to one side surface side of the seat and the other end side is set as a movable side end and is configured to be connected to the other side surface side of the seat and is arranged in front of a waist of the occupant seated on the seat when the movable side end is connected to the side surface side of the seat;
    the airbag is connected to an inflator arranged on the seat side via a gas supply path portion arranged on the fixed end side, inflows inflation gas into the inside and inflates so as to protrude from the holder and toward the occupant side, and is configured to cover from an upper surface of a thigh of the occupant to a front surface of an upper body of the occupant when inflation is completed, the airbag including:
        a lower inflation portion configured to cover the upper surface of the thigh when inflation is complete;
        an upper inflation portion configured to cover the front surface of the upper body; and
        a cross-inflation portion arranged between the lower inflation portion and the upper inflation portion;
    a length dimension of the holder is set to a dimension which secures a space for arranging the inflated cross-inflation portion between the waist and the holder when the inflation of the airbag is completed; and
    the holder is formed of a material having shape-retaining property and is curved in a substantially U-shape;
    the holder includes a holder body, formed from a flexible-strip shaped body, whose length dimension can be adjusted.

2. An occupant protection device which protects an occupant seated in a seat, comprising:
    an airbag which is folded and accommodated as a bag shape made of a flexible sheet body; and
    a holder configured to accommodate and hold the folded airbag, wherein:
    the holder is a long body where one end side is set as a fixed side end and is connected to one side surface side of the seat and the other end side is set as a movable side end and is configured to be connected to the other side surface side of the seat and is arranged in front of a waist of the occupant seated on the seat when the movable side end is connected to the side surface side of the seat;
    the airbag is connected to an inflator arranged on the seat side via a gas supply path portion arranged on the fixed end side, inflows inflation gas into the inside and inflates so as to protrude from the holder and toward the occupant side, and is configured to cover from an upper surface of a thigh of the occupant to a front surface of an upper body of the occupant when inflation is completed, the airbag including:
        a lower inflation portion configured to cover the upper surface of the thigh when inflation is complete;
        an upper inflation portion configured to cover the front surface of the upper body; and
        a cross-inflation portion arranged between the lower inflation portion and the upper inflation portion;
    a length dimension of the holder is set to a dimension which secures a space for arranging the inflated cross-inflation portion between the waist and the holder when the inflation of the airbag is completed;
    the holder includes a holder body, formed from a flexible strip-shaped body, whose length dimension can be adjusted;
    the folded body in which the airbag is folded and the gas supply path portion extending from the folded body are arranged so as to be deviation-movable with respect to the holder body; and
    the holder is arranged so as to cover an outer peripheral surface side of the holder body at positions between the folded body and the fixed side end and the movable side end, and the holder is configured to have a position adjusting unit configured to adjust a position of the folded body with respect to the occupant in a direction along the holder body when worn.

3. An occupant protection device which protects an occupant seated in a seat, comprising:
    an airbag which is folded and accommodated as a bag shape made of a flexible sheet body; and
    a holder configured to accommodate and hold the folded airbag, wherein:
    the holder is a long body where one end side is set as a fixed side end and is connected to one side surface side of the seat and the other end side is set as a movable side end and is configured to be connected to the other side surface side of the seat and is arranged in front of a waist of the occupant seated on the seat when the movable side end is connected to the side surface side of the seat;
    the airbag is connected to an inflator arranged on the seat side via a gas supply path portion arranged on the fixed end side, inflows inflation gas into the inside and inflates so as to protrude from the holder and toward the occupant side, and is configured to cover from an upper surface of a thigh of the occupant to a front surface of an upper body of the occupant when inflation is completed, the airbag including:
  a lower inflation portion configured to cover the upper surface of the thigh when inflation is complete;
  an upper inflation portion configured to cover the front surface of the upper body; and
  a cross-inflation portion arranged between the lower inflation portion and the upper inflation portion;
a length dimension of the holder is set to a dimension which secures a space for arranging the inflated cross-inflation portion between the waist and the holder when the inflation of the airbag is completed;
a seatbelt is provided on the seat to connect a tongue plate, which is a boundary part between a shoulder belt and a lap belt, to a buckle provided on the seat side when worn; and
the holder is configured such that the movable side end is connected to the seat by using the buckle of the seat belt;
the holder includes a holder body, formed from a flexible strip-shaped body, whose length dimension can be adjusted.

* * * * *